United States Patent [19]
Kalasek

[11] 3,951,300
[45] Apr. 20, 1976

[54] PRESSURE VESSEL

[75] Inventor: Karl Kalasek, Vienna, Austria

[73] Assignee: Vereinigte Edelstahlwerke Aktiengesellschaft (VEW), Vienna, Austria

[22] Filed: July 1, 1974

[21] Appl. No.: 484,962

[52] U.S. Cl. ................................ 220/327; 220/319; 220/378; 220/85 P
[51] Int. Cl.² ........................................ B65D 45/00
[58] Field of Search ........... 220/304, 310, 319, 320, 220/321, 327, 328, 344, 378, DIG. 3, 85 P

[56] References Cited
UNITED STATES PATENTS

| | | | |
|---|---|---|---|
| 1,705,454 | 3/1929 | Griffiths | 220/DIG. 3 |
| 1,894,679 | 1/1933 | Folmsbee | 220/327 |
| 2,330,306 | 9/1943 | Murphy | 220/327 |
| 2,749,162 | 6/1956 | Humphrey | 220/319 |
| 3,329,447 | 7/1967 | Hitz | 220/328 |

*Primary Examiner*—William Price
*Assistant Examiner*—Joseph M. Moy
*Attorney, Agent, or Firm*—Karl F. Ross; Herbert Dubno

[57] ABSTRACT

A vessel is formed with a peripheral flange upon which a lid is positionable to form a chamber within the vessel. The lid and flange are provided with juxtaposed grooves carrying a sealing member therebetween and a locking strip around the periphery of the pressure vessel for engagement with bolts secured to the lid.

7 Claims, 7 Drawing Figures

PRESSURE VESSEL

FIELD OF THE INVENTION

The present invention relates to pressure vessels and, more particularly, to the pressure-tight sealing of vessels in which either super-atmospheric pressure or reduced pressure can occur.

BACKGROUND OF THE INVENTION

Pressure vessels are known in which the lid is pressed onto the vessel with the aid of hinged bolts or plug-in bolts. The seal is, in these cases, provided by a vertical compression gasket. This type of fixing of the lid to the vessel is generally used only for vessels with relatively large openings. It also has the disadvantage that its operation requires a considerable amount of time and the tightening of the bolts must be carried out as evenly as possible to provide a good seal.

In order to facilitate the time-consuming operation entailed in opening and closing pressure vessels, central closures are also known. However, such closures are expensive and are usually used only for vessels with large openings.

Bayonet closures are frequently used for closing pressure vessels of small capacity, for example pressure cookers. In these designs, the seal is in most cases provided by lip gaskets and, in some cases, a self-adapting gasket is also used. On closing and opening of these locking devices, however, the resilient gasket rubs against the edge of the vessel, leading to premature wear of the gasket and hence to leakages. The abrasion of both the gasket and the metal parts also causes contamination of the contents of the vessel.

This phenomenon can have dangerous consequences in sterilization vessels for medical instruments. If such small particles, which adhere to the instruments to be sterilized, such as injection needles or injection syringes, enter the human or animal organism when these instruments are used, health may be detrimentally affected.

It is not only when using such pressure vessels for medical or pharmaceutical purposes that such contamination can have an adverse effect; such is also the case when pressure vessels are used in laboratories for research purposes and the like. Furthermore, such lid closures with lip gaskets are only suitable for super-atmosphere pressure vessels.

Usually, vessels designed for super-atmosphere pressures of up to 3 atmospheres gauge must be used to kill germs reliably. This excess pressure is required both for steam sterilizers and gas sterilizers. In addition it is necessary in many cases to extract the air from the pressure vessel prior to the steam sterilization. Gas sterilization makes it absolutely essential to extract air. For such applications, the lid closure must also be pressure-tight when a vacuum is applied.

OBJECTS OF THE INVENTION

It is therefore an object of the present invention to provide an improved pressure vessel for use with super-atmosphere and sub-atmosphere pressures.

It is another object of the invention to provide a pressure vessel which can be opened and closed quickly.

It is still another object of the invention to provide a pressure vessel in which there is no rubbing between the gasket and other parts of the vessel during opening and closing.

It is a further object of the invention to provide a pressure vessel which is free of contamination due to abrasion of its movable parts.

SUMMARY OF THE INVENTION

According to the present invention, a pressure vessel for enclosing material under super-atmospheric or sub-atmospheric pressure, comprises a hollow body or shell member having an opening, a lid member positionable over the opening to close the latter, an annular gasket on one of these members engageable in a groove in the other member to seal the opening, a plurality of peripherally spaced locking bolts outwardly of the groove and gasket on the lid or body member, capable of being passed through apertures in the other member and then through orifices in an annular locking strip, peripheral movement of the locking strip causing the locking strip to engage heads on the bolts to lock the lid in place.

With such a construction it is possible to provide pressure-tight closing of vessels under excess pressure or reduced pressure, in which abrasion of both the gasket and the metal parts is avoided and which can be used for any shape of vessel opening, whether round, elliptical (oval) or polygonal.

The closing and opening of the vessel according to the invention is effected by fitting the lid in such a way that the gasket engages, without undergoing abrasion, in the corresponding groove of the vessel or lid. The depth of penetration into the groove may be limited by spacers on the closing bolts, the spacers being located between the lid and the edge of the vessel.

On moving the locking strip, the orifices now slide under the heads of the bolts so that the lid is locked to the vessel. If there is excess super-atmosphere pressure in the interior of the vessel, the seal is provided by the floating gasket because the outer surface of the latter is pressed against the outer wall of the groove of the flange of the vessel.

On the other hand, if a reduced (sub-atmosphere) pressure prevails in the vessel, the inner surface of the floating gasket is pressed against the inner wall of the groove so that this effects a seal.

The design of the locking device according to the invention makes it possible to construct the lid either as a removable push-fit lid or to couple it to the vessel by means of hinges or to construct it as a sliding lid.

It is additionally advantageous to connect the locking strip directly to the test valve for the pressure vessel. This makes it possible only to open the lid, by sliding the locking strip, if the test valve is turned to bring it into a position which provides a connection to the interior of the vessel. This releases any excess pressure or reduced pressure and makes it possible to lift off the lid. On closing the lid, the test valve is turned after sliding the locking strip and the connection to the interior of the vessel is thus closed; only then can excess pressure or reduced pressure be set up in the interior of the vessel.

Closing and opening the vessel by means of the lid closure according to the invention requires only little exertion of force and also leads to no abrasion whatsoever of the gasket material and hence also to no contamination of the contents of the vessel.

A further advantage results if the lid is a push-fit lid and is lifted off, since now the gasket can no longer be damaged when the lid is removed. This is because the closing bolts are longer than the part of the gasket which protrudes from the lid and serve as guides for seating the cover or lid.

In order to ensure that the gasket can definitely not be forced out of the wedge-shaped groove when exposed to pressure, it is advisable to keep spacing between the lid and the edge of the vessel smaller than the length of the floating gasket pushed into the groove.

BRIEF DESCRIPTION OF THE DRAWING

The above and other features of the invention will now be described in detail with reference to the drawing in which.

SPECIFIC DESCRIPTION

Figure 1:
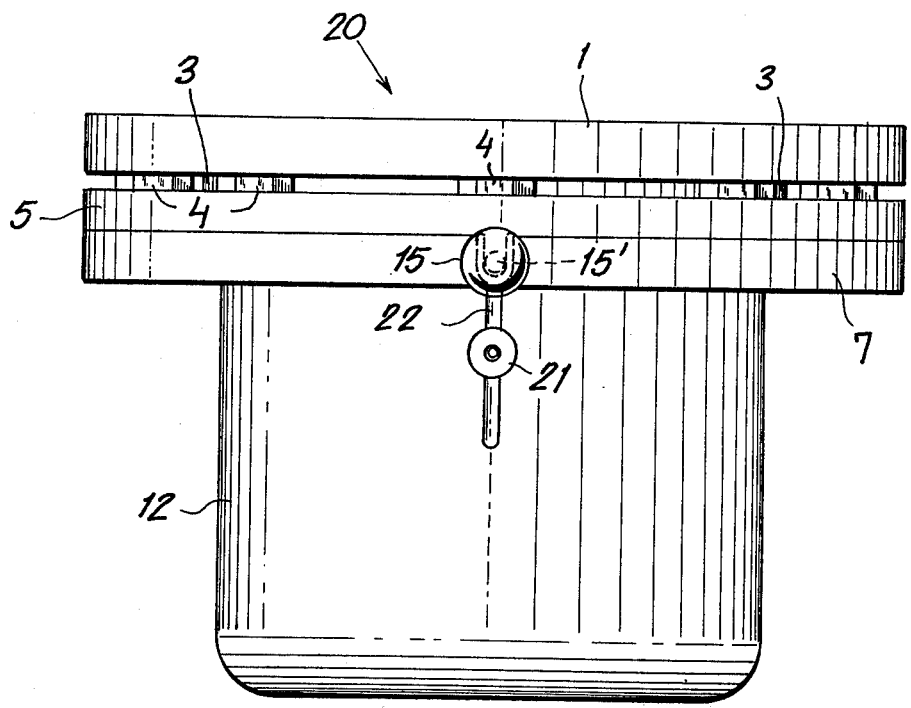
FIG. 1 is a front view of a pressure vessel according to the invention.

Referring now to the drawing, there is illustrated a lid 1 provided with a number of peripherally spaced locking bolts 2, each having a thickened (large-diameter) head 2' at its lower end. An annular floating gasket 3 is secured in a groove 3' in the lid 1 and has a downwardly convergent tapered portion 3" extending downwardly below the lid. Spacers 4 surrounding the bolts 2 maintain the correct spacing between the lid 1 and the flange 5 formed on the top of the vessel body 12.

Provided in the flange 5 are a number of apertures 6, through which the bolts 2 pass. The length of the bolts 2 is such that an annular locking strip 7, passing around the flange 5, can be positioned between the bottom of the flange and the top of the bolt head 2'. A narrow portion 8 is formed immediately above the head 2' of each bolt 2. In order to lock the lid 1 in place, the lid 1 is placed on top of the vessel, with the bolts 2 passing through the apertures 6, and through essentially keyhole shaped orifices comprising a slot 10 and a circular cut out portion 11, and when the strip is moved from the position illustrated in FIG. 3A to the position illustrated in FIG. 3, the slot 10 engages the groove 8, so that the head of the bolt abuts against the bottom of the strip 7.

Figure 2A:
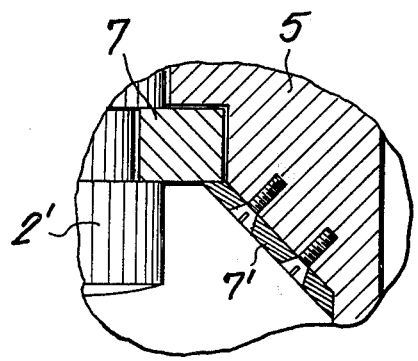
FIG. 2A is a sectional view of a portion of FIG. 2 showing another embodiment of the invention.
Figure 2:
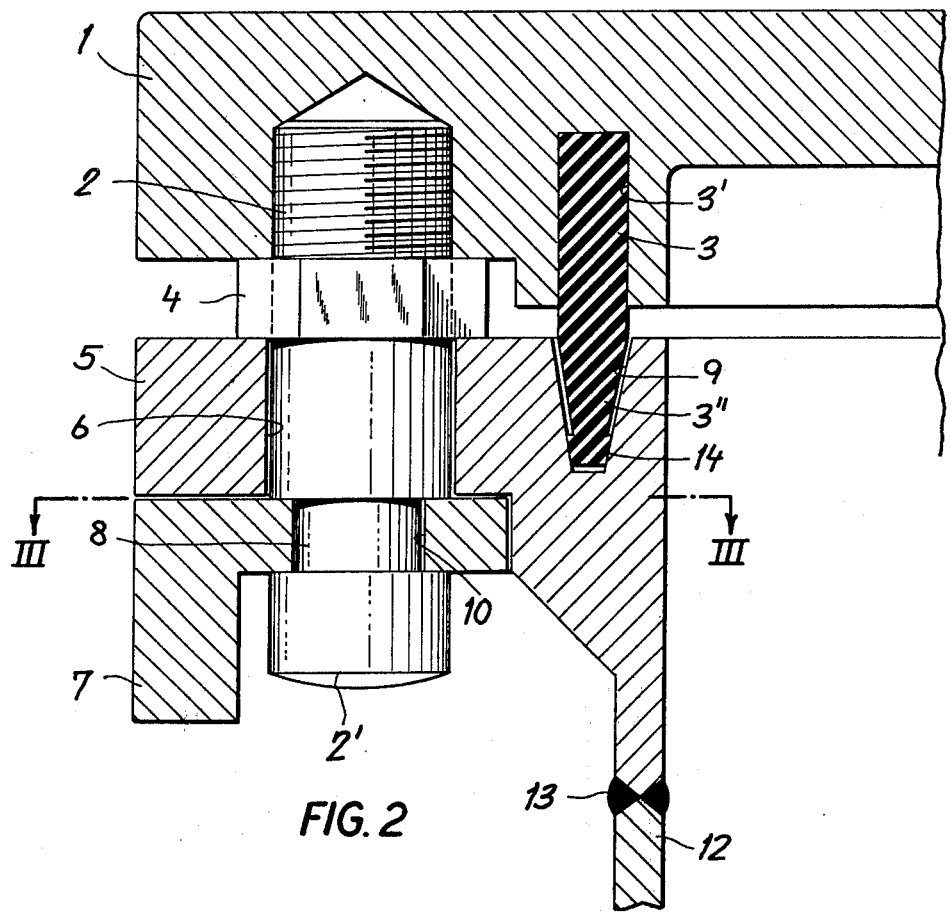
FIG. 2 is a sectional view through a portion of the vessel shown in FIG. 1.

In the embodiment illustrated in FIG. 2, the flange member 5 is formed separately from the remainder of the vessel 12 and is secured thereto by means of a weld 13.

The gasket 3 consists of a resilient, heat-resistant and tear-resistant material, e.g. a fiber reinforced rubber, and has near the lower end of the tapered portion 3" a thickening 14 which provides for improved sealing within the tapered annular groove 9 formed in flange 5.

Figure 3:
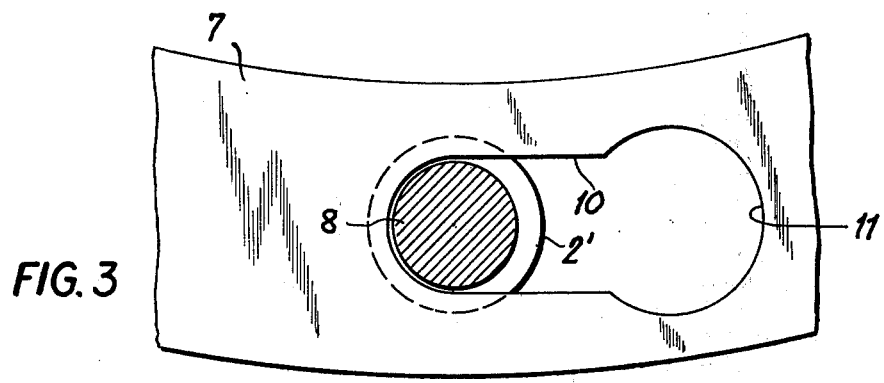
FIG. 3 is a cross-sectional view taken along line III—III of FIG. 2.
Figure 3A:
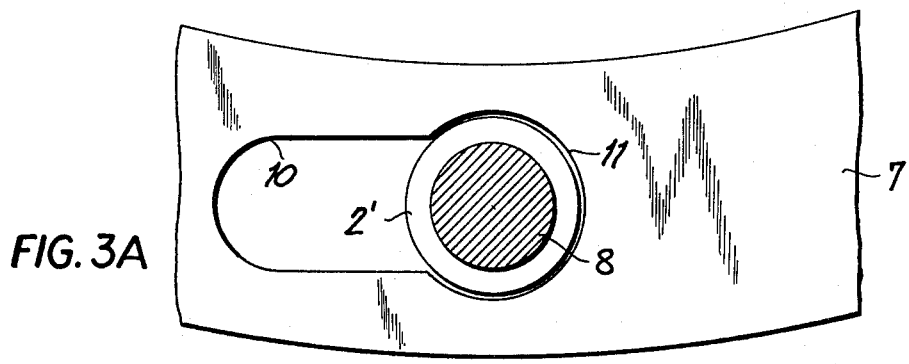
FIG. 3A is the same view as FIG. 3 showing an alternate position.
Figure 4:
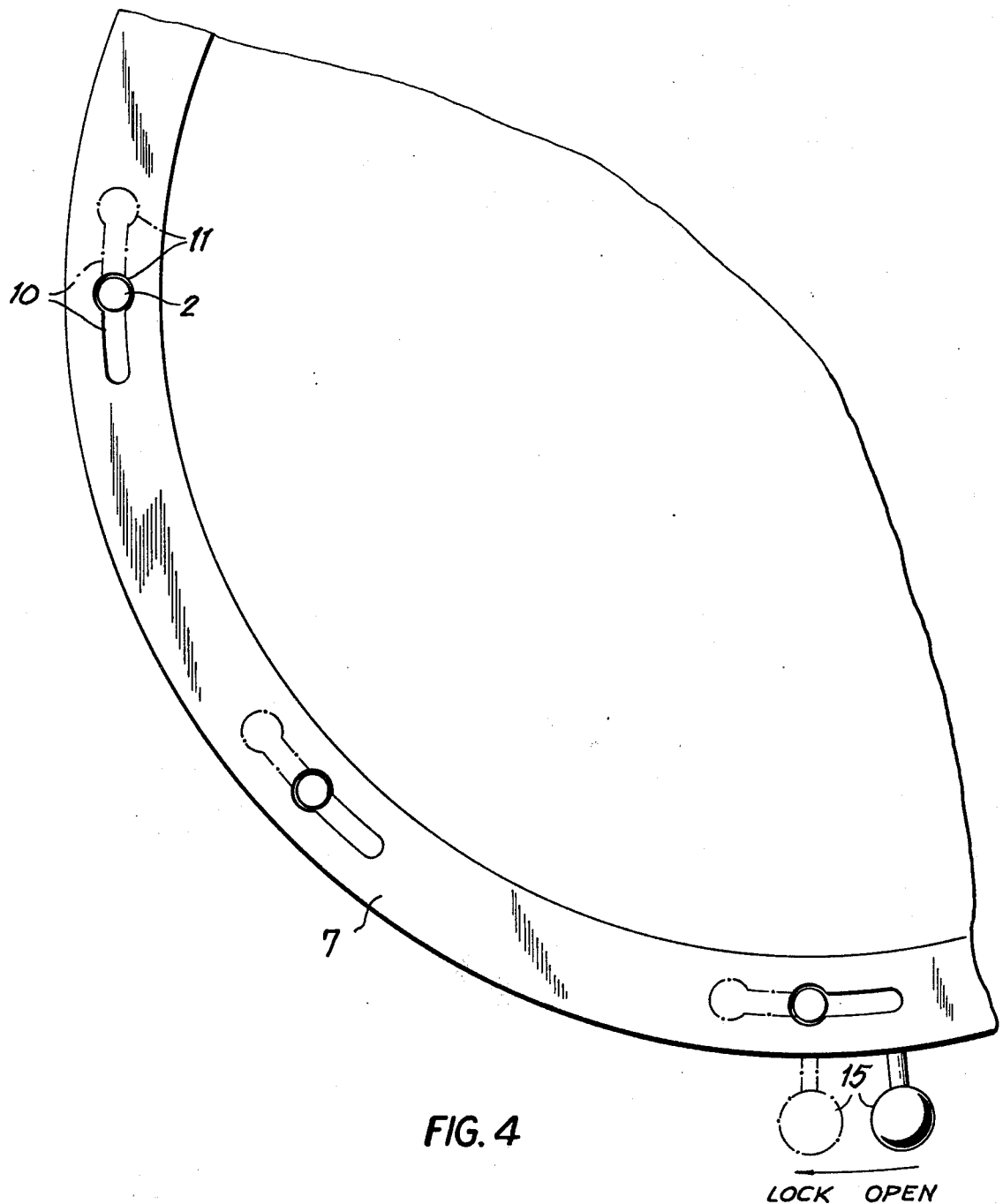
FIG. 4 is a bottom view of a portion of FIG. 1.

As can be seen from FIG. 4, the locking strip 7 is provided with one or more gripping members 15 to facilitate the peripheral sliding motion which moves the locking strip from its locked position, illustrated in FIG. 3, to its unlocked position illustrated in FIG. 3A and vice versa.

As can be further seen in FIG. 1 the vessel 12 is provided with a test valve 21 for venting between the interior of the vessel and the atmosphere. The valve 21 is provided with a forked extension 22 engageable with the stem 15' of gripping member 15 so that when the locking strip 7 is displaced into an unlocked position the valve 21 is also displaced from its illustrated closed position to an open position, thereby preventing the premature opening of the vessel while there is still a pressure differential.

In FIG. 2A an embodiment similar to that shown in FIG. 2 is provided with a member 7' for engaging the locking strip 7 in sliding contact with the flange 5.

Figure 5:
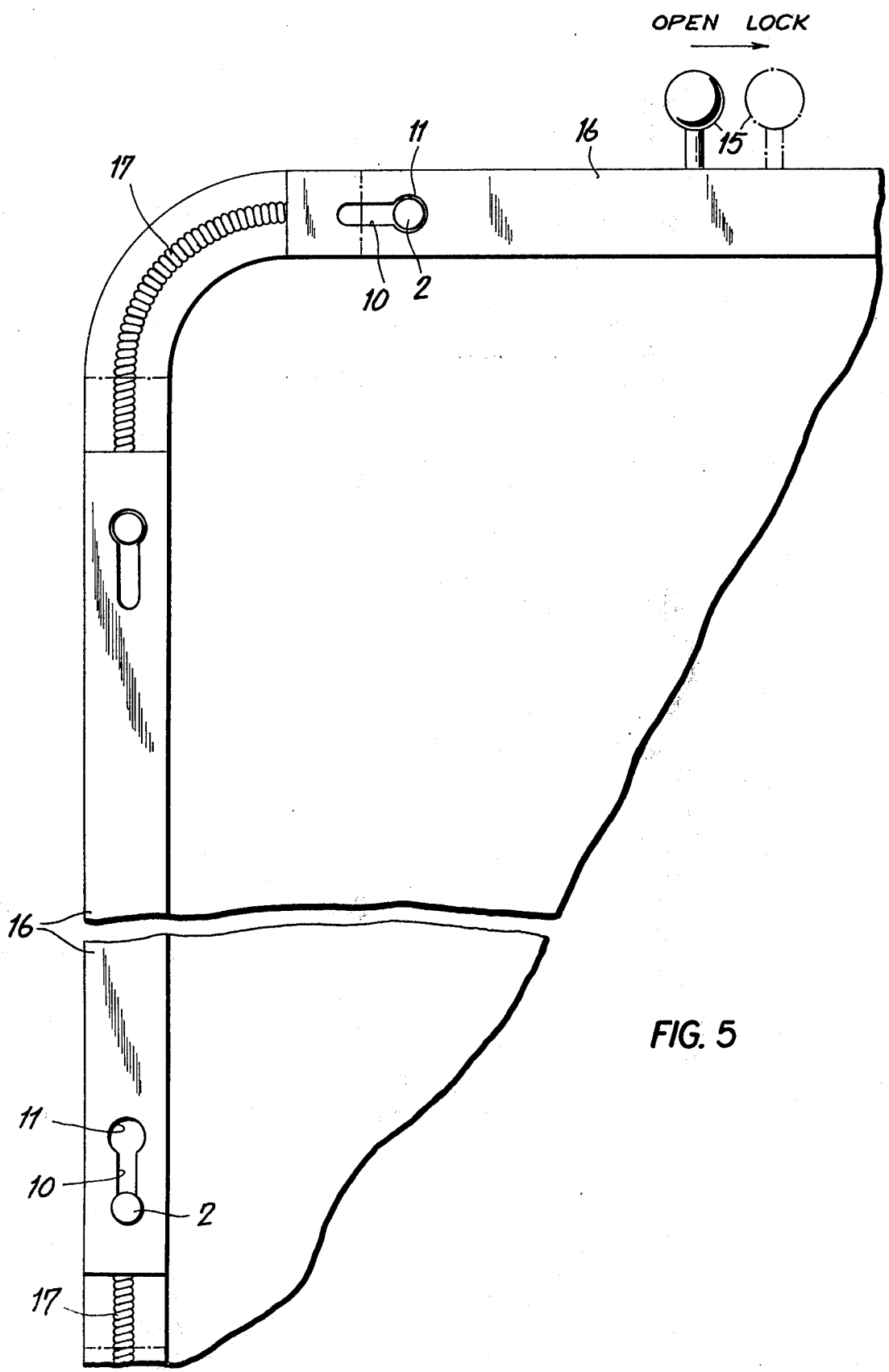
FIG. 5 is a bottom view of a portion of a pressure vessel according to another embodiment of the invention.

FIG. 5 shows a construction in which the opening into the vessel is rectangular although it may equally be any other polygonal form. In this construction, the locking strip consists os a series of rigid members 16 interconnected by resilient members in the form of compression springs 17. These compression springs can, for example, be leaf springs or coil springs but any other suitable device which permits movement of the rigid part 16 of the locking strip can also be used. The spring portions 17 enable the locking strip to pass around the corners of a polygonal opening in a vessel.

In the particular embodiment illustrated, the gasket 3 has a wedge-shaped form which is advantageous in certain circumstances. Any other suitable form of gasket may be used, and its cooperating groove may be of an appropriate cooperating shape. Equally, the gasket could be provided on the vessel and the groove on the lid. Similarly, the bolts could be provided on the vessel body, and could project upwardly through holes in the lid, the locking strip being secured above the top of the lid.

If the locking arrangement is as illustrated in FIGS. 1 and 2, with the bolt projecting downwardly, the apertures 6 can be formed in a series of lugs, rather than in a continuous flange. Equally, the flange or the lugs could be formed integrally with the body of the vessel itself rather than on a separate member welded thereon.

I claim:

1. A pressure receptacle comprising:

a vessel;

a flange member formed along the periphery of said vessel;

a removable lid member overlying said vessel and said flange member and defining a chamber with said vessel;

an annular sealing element between said lid member and said flange member, one of said members being provided with a peripheral array of bolts extending through the other of said members; and at least one locking strip shiftable along said other member and engageable with said bolts for locking said lid member to said flange member, said flange member being provided with a plurality of throughgoing holes, said bolts being secured to the underside of said lid member in registration with said holes and and passing downwardly therethrough, said strip being disposed beneath said flange member and being formed as an annular ring disposed beneath said flange member, said ring being formed with a plurality of keyhole-shaped openings receiving said bolts, said bolts having shanks formed with narrowed portions and enlarged heads, said heads passing through the larger ends of said keyhole-shaped openings and said narrowed portions of said bolts being engageable by the slots of said keyholes upon lateral displacement of said annular ring.

2. A pressure receptacle as defined in claim 1, further comprising:
a first vertically open annular groove formed in the underside of said lid member; and
a second vertically open annular groove formed in said flange member and registering with said first annular groove, said annular sealing element being seated in one of said grooves and being receivable in the other groove, said other groove being of a cross-section tapering away from said one of said grooves.

3. A pressure receptacle as defined in claim 2 wherein:
said one of said grooves is said first groove; and
other of said grooves is said second groove, said sealing element extending downwardly from said lid member for engagement with said second groove.

4. A pressure receptacle as defined in claim 3 wherein:
said sealing element converges downwardly in a wedge-shaped configuration;
a laterally extending portion is formed at the narrow end of said wedge-shaped configuration; and
said second groove has a downwardly converging configuration conforming to said sealing element.

5. A pressure receptacle as defined in claim 1, further comprising:
a spacer provided on each of said bolts between said lid member and said flange member for preventing direct contact between said members, said spacer having a thickness less than the height of said annular sealing element.

6. A pressure receptacle as defined in claim 1 wherein said vessel and said members are polygonal, and such strips are provided along each side, further comprises flexible elements interconnecting said strips.

7. The receptacle defined in claim 1, further comprising a valve for venting said vessel and means for coupling said strip with said valve whereby on locking movement of said strip is enabled only upon opening of said valve.

* * * * *